US007032777B2

(12) United States Patent
Good et al.

(10) Patent No.: US 7,032,777 B2
(45) Date of Patent: Apr. 25, 2006

(54) CHILD-RESISTANT TRIGGER SPRAYER

(75) Inventors: Robert J. Good, Lee's Summit, MO (US); Steven L. Sweeton, Lake Winnebago, MO (US)

(73) Assignee: Saint-Gobain Calmar, Inc., City of Industry, CA (US)

(*) Notice: Subject to any disclaimer, the term of this patent is extended or adjusted under 35 U.S.C. 154(b) by 24 days.

(21) Appl. No.: 10/685,382

(22) Filed: Oct. 16, 2003

(65) Prior Publication Data

US 2005/0082311 A1 Apr. 21, 2005

(51) Int. Cl.
*G01F 11/00* (2006.01)
*B67D 5/40* (2006.01)

(52) U.S. Cl. .................. 222/1; 222/153.13; 222/383.1

(58) Field of Classification Search .................... 222/1, 222/153.02, 153.13, 383.1
See application file for complete search history.

(56) References Cited

U.S. PATENT DOCUMENTS

| | | | | |
|---|---|---|---|---|
| 4,159,067 | A * | 6/1979 | Akers | 222/153.02 |
| 4,204,614 | A | 5/1980 | Reeve | |
| 4,346,821 | A * | 8/1982 | Wesner et al. | 222/153.02 |
| 4,506,805 | A | 3/1985 | Marcon | |
| 4,516,695 | A | 5/1985 | Garneau | |
| 4,946,074 | A * | 8/1990 | Grogan | 222/153.13 |
| 5,207,359 | A | 5/1993 | Steijns | |
| 5,482,186 | A | 1/1996 | Rodden, Jr. | |
| 5,564,604 | A | 10/1996 | Tada | |
| 5,823,395 | A * | 10/1998 | Foster et al. | 222/153.02 |
| 6,006,950 | A | 12/1999 | Watanabe et al. | |
| 6,186,366 | B1 | 2/2001 | Good et al. | |
| 6,286,723 | B1 | 9/2001 | Sweeton et al. | |
| 6,669,058 | B1 * | 12/2003 | Sweeton | 222/153.13 |
| 6,669,061 | B1 * | 12/2003 | Tada | 222/383.1 |

FOREIGN PATENT DOCUMENTS

| | | |
|---|---|---|
| FR | 002680707 A3 | 3/1993 |
| JP | 10-146542 | 6/1998 |
| JP | 2000-70792 | 3/2000 |
| JP | 2000-70793 | 3/2000 |
| JP | 2000-70794 | 3/2000 |
| JP | 2000-237646 | 9/2000 |
| JP | 2001-9331 | 1/2001 |
| JP | 2001-10653 | 1/2001 |
| JP | 2001-39461 | 2/2001 |

* cited by examiner

*Primary Examiner*—Joseph A. Kaufman
(74) *Attorney, Agent, or Firm*—Gordon & Jacobson, P.C.

(57) ABSTRACT

A trigger actuated liquid sprayer, including a pump body, a discharge nozzle mounted on a forward end of the body for manual rotation about a central axis thereof between discharge open and closed positions, and a trigger lever movably mounted to the body for operating a pumping mechanism upon actuation thereof. A trigger cover may be mounted on the sprayer and overlie a front face of the trigger lever in a first position for immobilizing trigger lever actuation. The trigger cover may be rotatable to a second position from the first position for exposing the front face for facilitating a grasp of the trigger lever for manual actuation thereof for operating the pumping mechanism. The trigger cover may be latched with the trigger lever in the first position to prevent rotation of the trigger cover from the first position to thereby render the sprayer child-resistant.

17 Claims, 2 Drawing Sheets

CHILD-RESISTANT TRIGGER SPRAYER

BACKGROUND OF INVENTION a. Field of Invention

The invention relates generally to a trigger actuated pump sprayer, and more particularly to such a sprayer having a trigger lock rendering the sprayer child-resistant.

b. Description of Related Art

The trigger actuated sprayer of known variety typically has a spray nozzle rotatable about its central axis between discharge open and closed positions. There may be two open and two intervening closed positions such that from a given closed position, the nozzle is capable of being rotated 90° in either direction to an open position and vice-versa.

When the nozzle is in the discharge closed or OFF positions, although the sprayer is designed such that product is not intended to discharge from the nozzle under these circumstances, the trigger lever is nevertheless capable of being actuated to a certain extent. For some residual quantity of liquid remaining within the nozzle, even in the discharge closed position, actuation of the trigger lever could produce a minor amount of unwanted discharge or leakage.

From a child safety viewpoint, for toxic or poisonous liquids, this minor discharge or leakage nevertheless remains an unacceptable feature of many of the trigger sprayers presently on the market. Moreover, from a child safety viewpoint, as recognized in the industry, a minimum two-step process for operating a device is required to render a device “child resistant”.

To address the aforementioned concerns with current trigger sprayer designs, some manufacturers have provided trigger covers including surface undulations which discourage a child from squeezing the trigger. To actuate the trigger having a trigger cover thereon, the cover may be rotated in a predetermined direction away from the trigger to expose the trigger. The cover may also include a stop bearing against the trigger to prevent rotation thereof in more than one direction. However, this design has drawbacks in that a simple one-step process of rotating the cover to expose the trigger is required to render the trigger operational.

The prior art also teaches the provision of a lock bar connected to the nozzle cap and overlying the trigger lever to prevent trigger actuation until the bar and nozzle are rotated to an open position. As with the aforementioned trigger cover design, for the lock bar design, a simple one-step process of rotating the nozzle to an ON position would render the trigger operational.

It would therefore be of benefit to provide a child-resistant trigger lever requiring a minimum two-step process before operating the trigger. There also remains a need for a child-resistant trigger sprayer, which is robust in design, efficient to operate, simple to assemble and disassemble, and which is economically feasible to manufacture.

SUMMARY OF INVENTION

The invention solves the problems and overcomes the drawbacks and deficiencies of prior art trigger sprayer designs by providing a child-resistant trigger sprayer requiring a minimum two-step process before enabling trigger actuation.

Thus, an exemplary aspect of the present invention is to provide a trigger sprayer which requires a two-step manipulation, and optionally an additional third step, to thereby enhance the child-resistant properties of the assembly when dispensing especially household or garden fluids which may be toxic or harmful especially when swallowed or when sprayed on one’s skin or face.

The invention achieves the aforementioned exemplary aspect by providing a trigger actuated liquid sprayer, including a pump body, a discharge nozzle mounted on a forward end of the body for manual rotation about a central axis thereof between discharge open and closed positions, and a trigger lever movably mounted to the body for operating a pumping mechanism upon actuation thereof. A trigger cover may be mounted on the sprayer and overlie a front face of the trigger lever in a first position for immobilizing trigger lever actuation. The trigger cover may be rotatable about the central axis to a second position from the first position for exposing the front face for facilitating a grasp of the trigger lever for manual actuation thereof for operating the pumping mechanism. The trigger cover may be latched with the trigger lever in the first position to prevent rotation of the trigger cover from the first position to thereby render the sprayer child-resistant.

For the sprayer described above, the trigger cover may further include an integrally formed cap mounted on the nozzle to enable simultaneous rotation of the nozzle therewith. The trigger cover may include at least one protrusion structured to discourage children from squeezing the trigger cover. The trigger lever may include a trigger tab integrally formed on an underside thereof, the tab being engageable with a latch on the trigger cover to lock the trigger cover in the first position. The trigger tab may be deflectable upwards to allow unlocking of the trigger cover from the first position, the upwards deflection being limited by a trigger tab stop integrally formed on the underside of the trigger lever. The latch may include a detent engaged with a side of the trigger tab for preventing rotation of the trigger cover from the first position. The detent may include a slanted wall for enabling upwards deflection of the trigger tab when the trigger cover is rotated from the second to the first position. The sprayer may include a shroud having a locking tab engageable with a notch in the cap to prevent rotation of the trigger cover from the first position. The locking tab may be resilient for enabling downward deflection thereof for disengagement from the notch to allow rotation of the trigger cover to the second position.

The invention further provides a method of operating a child-resistant trigger actuated liquid sprayer. The sprayer may include a pump body, a discharge nozzle mounted on a forward end of the body for manual rotation about a central axis thereof between discharge open and closed positions, and a trigger lever movably mounted to the body for operating a pumping mechanism upon actuation thereof. The method may include providing a trigger cover mounted on the sprayer and overlying a front face of the trigger lever in a first position for immobilizing trigger lever actuation, latching the trigger cover with the trigger lever in the first position to prevent rotation of the trigger cover from the first position, and unlatching the trigger cover from the trigger lever. The method may further include rotating the trigger cover about the central axis to a second position from the first position for exposing the front face for facilitating a grasp of the trigger lever for manual actuation thereof for operating the pumping mechanism.

For the method described above, the method may further include providing the trigger cover with an integrally formed cap mounted on the nozzle to enable simultaneous rotation of the nozzle therewith, providing the trigger cover with at least one protrusion structured to discourage children from squeezing the trigger cover, and providing the trigger lever with a trigger tab integrally formed on an underside thereof, the tab being engageable with a latch on the trigger cover to lock the trigger cover in the first position. The method may yet further include deflecting the trigger tab upwards to effectuate unlocking of the trigger cover from the first position, the upwards deflection being limited by a trigger tab stop integrally formed on the underside of the trigger lever, and engaging a detent provided on the latch with a side of the trigger tab for preventing rotation of the trigger cover from the first position. The detent may include a slanted wall for enabling upwards deflection of the trigger tab when the trigger cover is rotated from the second to the first position. The method may also include providing the sprayer with a shroud having a locking tab engageable with a notch in the cap to prevent rotation of the trigger cover from the first position, and deflecting the locking tab downwards to disengage the tab from the notch to allow rotation of the trigger cover to the second position.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE PREFERRED EMBODIMENTS

Figure 1:
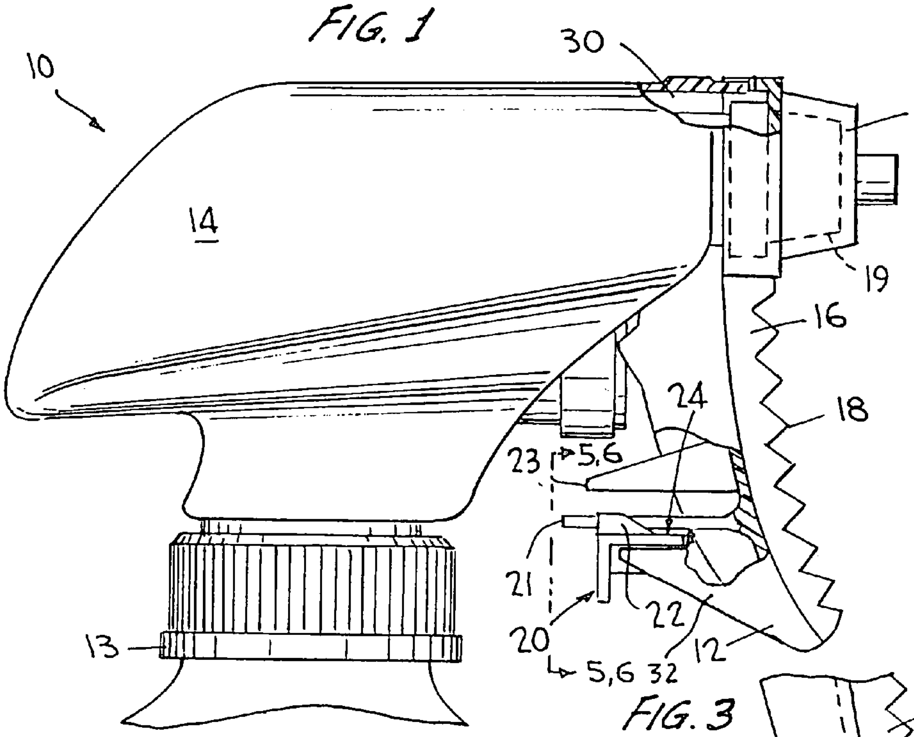
FIG. 1 is a left side view of a child-resistant trigger sprayer according to the present invention, including partial cutout views of the latch for the trigger cover and a locking tab provided on the shroud.

Referring now to the drawings wherein like reference numerals designate corresponding parts throughout the several views, FIGS. 1–8 illustrate a child-resistant trigger sprayer (hereinafter trigger sprayer) according to the present invention, generally designated 10.

Figure 4:
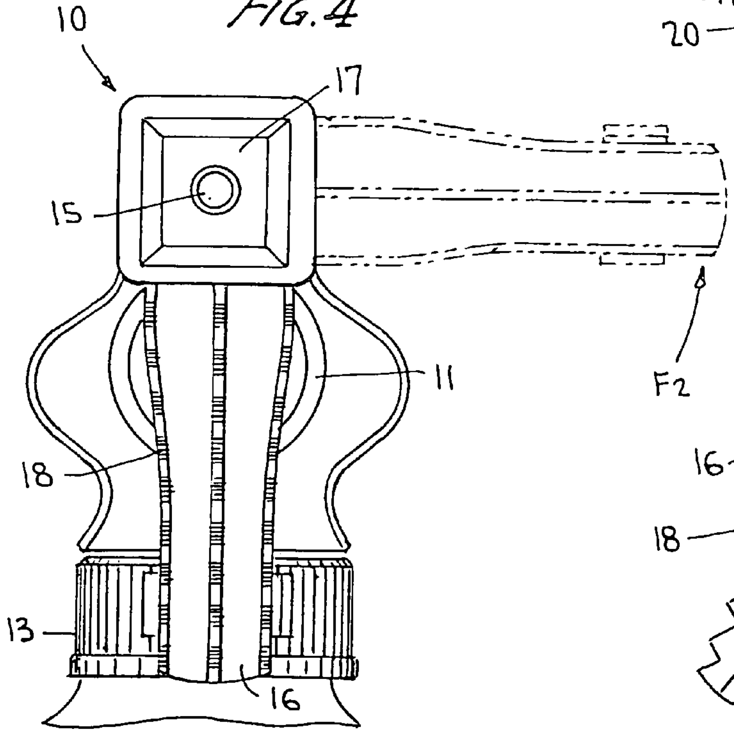
FIG. 4 is a front view of the trigger sprayer of FIG. 1, illustrating the trigger cover in phantom outline rotated counter-clockwise away from the trigger to enable trigger actuation.

As shown in FIGS. 1 and 4, trigger sprayer 10 may include a pump body with a pump piston (not shown) reciprocating within a pump cylinder 11 of the pump body, a trigger lever 12 movably mounted to the pump body with its top in engagement with the pump piston for the reciprocation thereof upon manual squeeze of the trigger as in a manner known in this art. The trigger sprayer may be structured for operation essentially the same as that disclosed in U.S. Pat. No. 5,114,049, commonly owned herewith and the disclosure of which is incorporated herein by reference. A container closure 13, which may be internally threaded, may be coupled to the pump body for mounting trigger sprayer 10 to the neck of a container (not shown) of liquid to be sprayed.

A sprayer nozzle cap 19 may be mounted to the pump body at the forward end of a shroud 14 which covers the pump body, the cap being rotatable about its central axis without shifting along that axis, and having a discharge orifice co-axial with the discharge passage (not shown) in the pump body. Internal spin mechanics (not shown) may be contained within the nozzle cap such that upon each squeeze of trigger 12 after the pump is primed, liquid product is discharged through its orifice 15 (FIG. 4) in the form of a fine mist spray as in a manner well known in this art.

Figure 8:
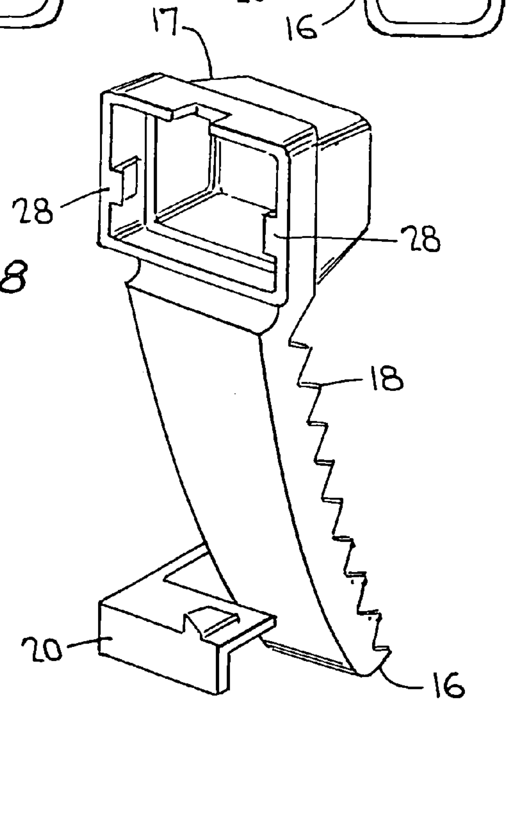
FIG. 8 is an isometric view of the trigger cover illustrating the latch and internal configuration of the cap.

In accordance with the invention, a trigger cover 16 may be provided and includes an integrally formed cap 17 that may be designed or otherwise mounted to the sprayer nozzle. Cap 17 may be transparent or made of translucent material to enable viewing of any graphics on the nozzle, or the cap may itself include graphics. As illustrated in FIG. 8, cap 17 may further include engagement projections 28 along its internal walls to engage with and snap onto the outer walls of the existing nozzle for sprayer 10. Jagged protrusions 18 may be located on the front of trigger cover 16 to discourage children from squeezing trigger 12 while the nozzle is in the OFF position. Thus protrusions 18 may discourage a child from squeezing the trigger when cover 16 is disposed in alignment with trigger 12, and likewise discourage an adult from inadvertently squeezing trigger 12. It should be noted that the protrusions illustrated in FIG. 1 are for illustrative purposes only, and various other alternative designs, such as detents, vertical edges, etc., may be utilized for generating a measured amount of discomfort in a user's hands or fingers for discouraging the user from squeezing trigger 12.

Figure 3:
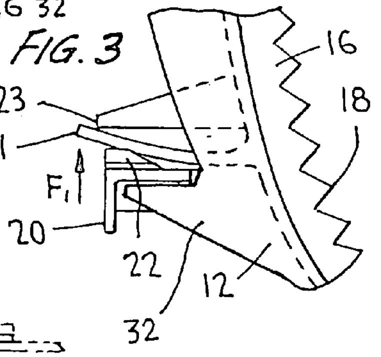
FIG. 3 is a left side cutout view of the latch for the trigger cover of FIG. 1, illustrating the latch assembly in a unlatched configuration.
Figure 2:
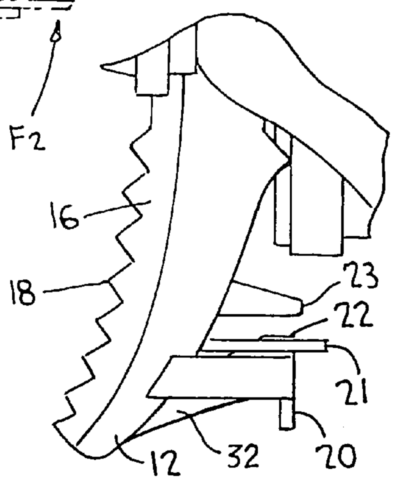
FIG. 2 is a right side cutout view of the latch for the trigger cover of FIG. 1, illustrating the latch assembly in a latched configuration.
Figure 5:
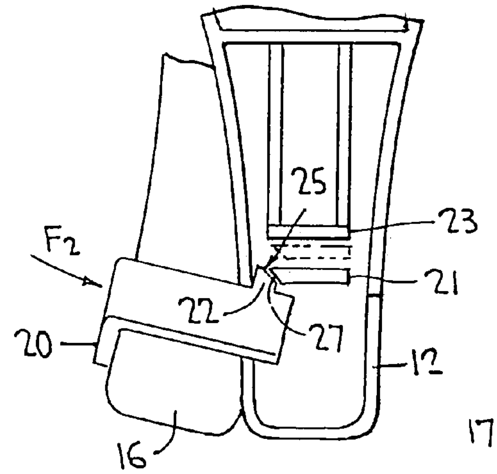
FIG. 5 is a cross-sectional view of the latch of FIG. 1, taken along section 5—5 in FIG. 1, but illustrating latch operation during clockwise rotation of the phantom trigger cover in FIG. 4.

Referring to FIGS. 1–3, 5 and 6, trigger cover 16 may further include an integrally formed latch 20 which bears against one side of trigger 12. Latch 20 may extend rearwardly of trigger 12 to engage with trigger tab 21 protruding rearwardly from the underside of trigger 12, and be retained in the engaged configuration of FIGS. 1 and 2 by means of a detent 22. As shown in FIG. 5, outer wall 25 of detent 22 may be slanted to allow trigger tab 21 to deflect upwards for locking tab 21 in place as discussed in further detail below. Trigger tab 21 may be formed on trigger 12 to hinge upwards, as illustrated in FIGS. 2 and 3, by means of a force-$F_1$ applied by a user's finger as discussed below, or by sliding engagement of slanted outer wall 25 with corresponding slanted wall 27 of trigger tab 21. A trigger tab stop 23 may be provided on trigger 12 to limit the upwards deflection of tab 21, and surface 24 on latch 20 in conjunction with optional rib 32 may likewise prevent the downward deflection of tab 21.

As shown in FIG. 4, trigger cover 16 may be rotatable 90° counter-clockwise to allow actuation of trigger 12 when in the configuration of FIG. 4. Those skilled in the art would appreciate in view of this disclosure that trigger cover 16 may be designed such that latch 12 provides for rotation of cover 16 in the clock-wise direction as needed. The phantom rotated orientation of trigger cover 16 for FIG. 4 may correspond to an ON position for discharge of liquid through orifice 15 upon actuation of trigger 12, and the solid vertical orientation of cover 16 may correspond to an OFF position to prevent the discharge of liquid through orifice 15.

Figure 6:
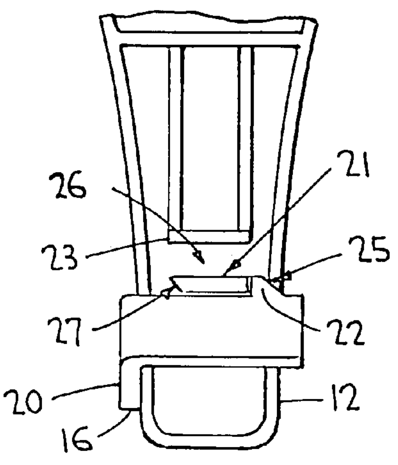
FIG. 6 is a cross-sectional view of the latch of FIG. 1, taken along section 6—6 in FIG. 1.

In operation, trigger cover 16 may first be oriented substantially as illustrated in the rotated configuration for FIG. 4 in phantom outline and mounted on the nozzle cap of a trigger sprayer 10 by snap fitting cap 17 onto the existing nozzle cap along the axis of orifice 15. Once fitted onto the existing nozzle cap, cover 16 may be rotated clock-wise from the configuration for FIG. 4 such that slanted outer wall 25 of detent 22 engages corresponding slanted wall 27 of trigger tab 21 to deflect tab 21 upwards. As illustrated in FIGS. 5 and 6, continued clock-wise rotation of trigger cover 16 acts to snap trigger tab 21 into area 26 to lock cover 16 into place.

To place the nozzle in its ON position from the OFF position illustrated in FIG. 1, as a first step, trigger tab 21 may be deflected upwards to the configuration illustrated in FIG. 3 by means of force-$F_1$ applied by a user's finger until tab 21 reaches trigger tab stop 23. As tab 21 clears the height of detent 22, while maintaining tab 21 in the upwards deflected position, a force-$F_2$, as illustrated in FIG. 4, may be applied to the side of trigger cover 16 to rotate cover 16 counter-clockwise to expose trigger 12 and place the nozzle in its ON position. This minimum two-step sequential process required to place the nozzle in its ON position renders trigger sprayer 10 child-resistant, in conformance with current industry standards.

Figure 7:
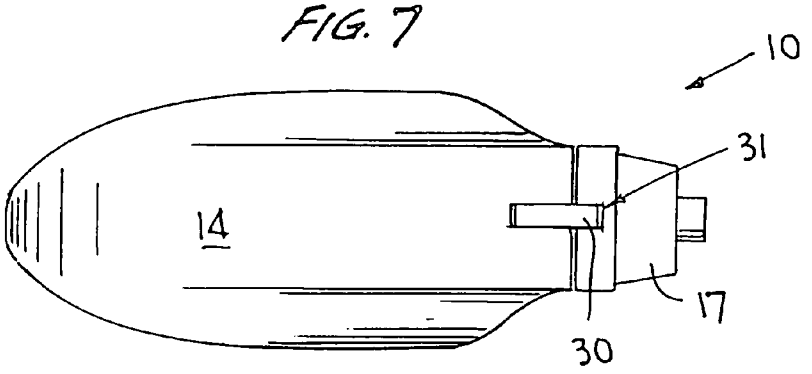
FIG. 7 is a further embodiment of a child-resistant trigger sprayer according to the present invention, including a shroud locking tab for providing an additional means of locking the sprayer nozzle in its OFF position.

In a further embodiment of trigger sprayer 10, as illustrated in FIG. 7, sprayer 10 may include a resilient shroud locking tab 30 on the top face thereof for engagement with a cutout 31 in cap 17. Shroud locking tab 30, in addition to latch 20 may provide for a third sequential step required to effect nozzle rotation to its ON position. Thus for a sprayer 10 including latch 20 and shroud locking tab 30, in order to place the nozzle in its ON position from the OFF position illustrated in FIG. 1, as a first step, trigger tab 21 may be deflected upwards to the configuration illustrated in FIG. 3 by means of a force-$F_1$ applied by a user's finger until tab 21 reaches trigger tab stop 23. At the same time, tab 30 may be pressed downwards. With tab 21 deflected upwards to clear the height of detent 22 and tab 30 pressed downwards for disengagement with cutout 31 in cap 17, a force-$F_2$, as illustrated in FIG. 4, may be applied to the side of trigger cover 16 to rotate cover 16 counter-clockwise to expose trigger 12 and place the nozzle in its ON position. Thus, a minimum three-step sequential process is required to place the nozzle in its ON position, also rendering trigger sprayer 10 child-resistant and inoperable by users without the exact know-how of the operating requirements.

In another of the embodiments disclosed which incorporates the invention, a foamer cap (not shown) may be snap fitted at the forward end of cap 17 for effecting the spray discharge in the form of a foam when the spray nozzle is rotated into at least one of its discharge open positions. The roamer cap may be in the form of the foamer nozzle as disclosed in U.S. Pat. No. 5,647,539, commonly owned herewith, and specifically incorporated herein by reference.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A trigger actuated liquid sprayer, comprising a pump body, a discharge nozzle mounted on a forward end of said body for manual rotation about a central axis thereof between discharge open and closed positions, a trigger lever movably mounted to said body for operating a pumping mechanism upon actuation thereof, a trigger cover mounted on said sprayer and overlying a front face of said trigger lever in a first position for immobilizing trigger lever actuation, said trigger cover being rotatable about said central axis to a second position from said first position for exposing said front face for facilitating a grasp of said trigger lever for manual actuation thereof for operating said pumping mechanism, and said trigger cover being latched with said trigger lever in said first position to prevent rotation of said trigger cover from said first position to thereby render the sprayer child-resistant, wherein said trigger lever includes a trigger tab integrally formed on an underside thereof, said tab being engageable with a latch on said trigger cover to lock said trigger cover in said first position, and said trigger tab is deflectable upwards to allow unlocking of said trigger cover from said first position.

2. A sprayer according to claim 1, wherein said trigger cover further includes an integrally formed cap mounted on said nozzle to enable simultaneous rotation of said nozzle therewith.

3. A sprayer according to claim 1, wherein said trigger cover includes at least one protrusion structured to discourage children from squeezing said trigger cover.

4. A sprayer according to claim 1, wherein said upwards deflection is limited by a trigger tab stop integrally formed on said underside of said trigger lever.

5. A sprayer according to claim 4, wherein said latch includes a detent engaged with a side of said trigger tab for preventing rotation of said trigger cover from said first position.

6. A sprayer according to claim 5, wherein said detent includes a slanted wall for enabling upwards deflection of said trigger tab when said trigger cover is rotated from said second to said first position.

7. A sprayer according to claim 2, wherein said sprayer includes a shroud having a locking tab engageable with a notch in said cap to prevent rotation of said trigger cover from said first position.

8. A sprayer according to claim 7, wherein said locking tab is resilient for enabling downward deflection thereof for disengagement from said notch to allow rotation of said trigger cover to said second position.

9. A method of operating a child-resistant trigger actuated liquid sprayer, said sprayer having a pump body, a discharge nozzle mounted on a forward end of said body for manual rotation about a central axis thereof between discharge open and closed positions, a trigger lever movably mounted to said body for operating a pumping mechanism upon actuation thereof, said method comprising providing a trigger cover mounted on said sprayer and overlying a front face of said trigger lever in a first position for immobilizing trigger lever actuation, and providing said trigger lever with a trigger tab integrally formed on an underside thereof, said tab being engageable with a latch on said trigger cover, latching said trigger cover with said trigger lever in said first position with said trigger tab engaging said latch on said trigger cover lock said trigger cover in said first position and to prevent rotation of said trigger cover from said first position, unlatching said trigger cover from said trigger lever by deflecting said trigger tab upwards to effectuate unlocking of said trigger cover from said first position, and rotating said trigger cover about said central axis to a second position from said first position for exposing said front face for facilitating a grasp of said trigger lever for manual actuation thereof for operating said pumping mechanism.

10. A method according to claim 9, further comprising providing said trigger cover with an integrally formed cap mounted on said nozzle to enable simultaneous rotation of said nozzle therewith.

11. A method according to claim 9, further comprising providing said trigger cover with at least one protrusion structured to discourage children from squeezing said trigger cover.

12. A method according to claim 11, wherein said upwards deflection is limited by a trigger tab stop integrally formed on said underside of said trigger lever.

13. A method according to claim 12, further comprising engaging a detent provided on said latch with a side of said trigger tab for preventing rotation of said trigger cover from said first position.

14. A method according to claim 13, wherein said detent includes a slanted wall for enabling upwards deflection of said trigger tab when said trigger cover is rotated from said second to said first position.

15. A method according to claim 10, further comprising providing said sprayer with a shroud having a locking tab engageable with a notch in said cap to prevent rotation of said trigger cover from said first position.

16. A method according to claim 15, further comprising deflecting said locking tab downwards to disengage said tab from said notch to allow rotation of said trigger cover to said second position.

17. A trigger actuated liquid sprayer, comprising a pump body, a discharge nozzle mounted on a forward end of said body for manual rotation about a central axis thereof between discharge open and closed positions, a trigger lever movably mounted to said body for operating a pumping mechanism upon actuation thereof, said trigger lever including a trigger tab integrally formed on an underside thereof, a trigger cover mounted on said sprayer and overlying a front face of said trigger lever in a first position for immobilizing trigger lever actuation, said trigger cover including a latch which engages said trigger tab of said trigger lever in said first position to prevent rotation of said trigger cover from said first position to thereby render the sprayer child-resistant, said trigger tab being deflectable upwards to allow unlocking of said trigger cover from said first position, and said trigger cover being rotatable to a second position from said first position for exposing said front face for facilitating a grasp of said trigger lever for manual actuation thereof for operating said pumping mechanism, and said trigger cover being rotatable from said second position back to said first position and being latched again with said trigger lever in said first position to prevent rotation of said trigger cover from said first position to thereby render the sprayer child-resistant.

* * * * *